(12) United States Patent
Fox et al.

(10) Patent No.: US 7,641,415 B2
(45) Date of Patent: Jan. 5, 2010

(54) AUTOMATIC LOCKING BALL COUPLER FOR POWER TAKE OFF

(75) Inventors: Robert Neil Fox, Appling, GA (US); Brian Richard Clement, Grovetown, GA (US); Chirstopher Allen Fox, Martinez, GA (US)

(73) Assignee: Deere & Company, Moline, IL (US)

( * ) Notice: Subject to any disclaimer, the term of this patent is extended or adjusted under 35 U.S.C. 154(b) by 121 days.

(21) Appl. No.: 11/344,446

(22) Filed: Jan. 31, 2006

(65) Prior Publication Data

US 2007/0177938 A1    Aug. 2, 2007

(51) Int. Cl.
*A01B 33/14* (2006.01)

(52) U.S. Cl. ............... 403/322.2; 403/322.3; 403/325; 180/53.6; 172/74; 74/15.6

(58) Field of Classification Search ............... 403/322.1, 403/325, 322.2, 322.3, 322.4, 359.3, 359.5, 403/359.1; 180/53.6; 464/901, 136, 182, 464/35, 36; 56/DIG. 6; 172/74, 125, 275; 74/11, 15.6
See application file for complete search history.

(56) References Cited

U.S. PATENT DOCUMENTS

| | | | | |
|---|---|---|---|---|
| 2,769,646 | A | 11/1956 | Omon et al. | 280/504 |
| RE24,415 | E | 1/1958 | Oehler et al. | 280/477 |
| 2,869,654 | A | 1/1959 | Hershman | 172/272 |
| 2,882,704 | A * | 4/1959 | Quackenbush | 464/35 |
| 3,420,550 | A | 1/1969 | Rau | 280/461 |
| 3,427,046 | A | 2/1969 | Sommer et al. | 280/479 |
| 3,539,203 | A | 11/1970 | Baugh | 280/504 |
| 3,572,759 | A | 3/1971 | Baugh et al. | 280/461 |
| 3,817,557 | A | 6/1974 | Manor | 280/452 |
| 3,977,698 | A | 8/1976 | von Allworden | 280/461 |
| 4,069,885 | A | 1/1978 | Gego et al. | 180/14 |
| 4,090,725 | A | 5/1978 | Perin | 280/479 |
| 4,157,019 | A * | 6/1979 | von Allworden | 464/901 |
| 4,169,686 | A * | 10/1979 | Balensiefen et al. | 403/322.2 |
| 4,176,727 | A | 12/1979 | Perin | 180/53 |
| 4,340,240 | A | 7/1982 | Anderson | 280/461 |
| 4,349,092 | A * | 9/1982 | Geisthoff | 74/11 |
| 4,433,767 | A | 2/1984 | Thor | 192/67 |
| 4,492,292 | A | 1/1985 | Thor | 192/67 |
| 4,560,300 | A * | 12/1985 | Vollmer et al. | 403/325 |
| 4,588,323 | A * | 5/1986 | Vollmer et al. | 403/322.4 |
| 4,792,006 | A | 12/1988 | Nienhaus et al. | 180/53.3 |
| 4,813,810 | A * | 3/1989 | Suzuki | 403/322.2 |

(Continued)

FOREIGN PATENT DOCUMENTS

EP    0 068 106    5/1982

(Continued)

*Primary Examiner*—Michael P Ferguson

(57) ABSTRACT

An automatic locking ball coupler for a power take off includes a ball keeper connected to the power take off and having a longitudinal axis and openings in a cylindrical surface thereof. Locking balls are received in the openings and can move radially with respect to the axis of the cylindrical ball keeper. A ball collar is positioned around the cylindrical ball keeper and has a plurality of internal circumferential rings and recesses between each ring. The ball collar can slide axially with respect to the longitudinal axis of the ball keeper between a coupled position in which the locking balls are on the rings and an uncoupled position in which the locking balls are in the recesses.

12 Claims, 5 Drawing Sheets

U.S. PATENT DOCUMENTS

| | | |
|---|---|---|
| 4,887,680 A | 12/1989 | Nozaka et al. ............. 180/53.3 |
| 4,934,471 A | 6/1990 | Tanaka et al. ............. 180/14.4 |
| 4,944,354 A | 7/1990 | Langen et al. ................ 172/47 |
| 4,957,387 A | 9/1990 | Nasu |
| 4,960,344 A * | 10/1990 | Geisthoff et al. ......... 403/322.2 |
| 5,064,338 A | 11/1991 | Lawrence ................... 414/685 |
| 5,193,623 A | 3/1993 | Burette ....................... 172/47 |
| 5,303,790 A | 4/1994 | Coleman ................... 180/53.3 |
| 5,522,669 A * | 6/1996 | Recker ....................... 403/325 |
| 5,538,088 A | 7/1996 | Wait ........................... 172/439 |
| 5,601,380 A | 2/1997 | Guthrie et al. |
| 5,657,825 A | 8/1997 | Englund ..................... 172/439 |
| 6,062,319 A | 5/2000 | Schwalenberg et al. ..... 172/272 |
| 6,267,528 B1 * | 7/2001 | Higashino ................ 403/359.5 |
| 6,725,583 B2 | 4/2004 | Sprinkle et al. ............... 37/468 |

FOREIGN PATENT DOCUMENTS

| | | |
|---|---|---|
| EP | 0 227 112 | 4/1990 |
| EP | 0 379 834 | 8/1994 |
| WO | WO 95/10174 | 10/1994 |

* cited by examiner

AUTOMATIC LOCKING BALL COUPLER FOR POWER TAKE OFF

FIELD OF THE INVENTION

This invention relates generally to coupler devices between tractor power take offs and agricultural implements, and specifically to automatic locking ball couplers for coupling power take offs to shafts of rear mounted implements.

BACKGROUND OF THE INVENTION

Tractors may be equipped with a power take off (PTO) that transmits rotary power from an engine to an implement. The most common location for the PTO shaft is at the rear of the tractor, but some tractors have auxiliary PTO shafts at other locations. The direction of rotation, rotational speed, approximate location and exact dimensions of the PTO shaft are standardized to provide ability to interchange between power shafts on various implements made by different manufacturers. PTO shafts typically rotate at 540 rpm, 1000 rpm, 2100 rpm, or more than one speed.

To engage the PTO to the shaft or drive line of a rear mounted implement, the PTO may have the ability to telescope. After the tractor is in proper position, the tractor operator may manually extend the telescoping PTO and employ various coupler devices to couple the PTO to the implement power shaft. This requires getting down off the seat or operator station of the tractor, and it can be quite time consuming to couple the power take off to the implement manually. Coupling a tractor PTO to the driveline of an implement also can be difficult and dirty.

In the past, PTOs have been coupled to implement drivelines using splines to transmit rotational power, along with an additional keeper to secure the coupled parts and resist thrust loads. Often it is difficult to find the correct alignment for the female spline of the drive line and the male spline of the tractor PTO. Sometimes it is necessary for the operator to turn the implement drive line until the correct alignment is found.

After correct alignment is accomplished, the operator still must hold back a driveline locking feature until the implement shaft or driveline is in place. It may be difficult to manipulate the lock back feature or turn the implement driveline to obtain correct alignment between the PTO and the implement shaft.

A need exists for an improved apparatus and method for coupling a PTO on a tractor to the shaft or driveline of a rear mounted implement. There is a need for an apparatus and method that may be used to couple a variety of different implements having shafts at different locations relative to the tractor PTO. There is a need for an apparatus and method that will allow coupling a tractor PTO to driven rear mounted implements without requiring the operator to leave the tractor seat. There is a need for greater operator safety and ease of use when hooking up a tractor PTO to the shaft of a rear mounted implement.

SUMMARY OF THE INVENTION

An improved apparatus and method are provided for coupling a PTO on a tractor to the shaft or driveline of a rear mounted implement. The invention may be used to couple a variety of different implements having shafts at different locations relative to the tractor PTO. The invention allows coupling a tractor PTO to driven rear mounted implements without requiring the operator to leave the tractor seat. The invention enhances operator safety and ease of use when hooking up a tractor PTO to the shaft of a rear mounted implement.

The coupler of the present invention includes a hollow cylindrical ball keeper having a first end connected to a tractor driveline which is connected to the tractor power take off. The ball keeper may have a plurality of circular openings, and locking balls are slidably received in the circular openings. A hollow cylindrical ball collar fits around the ball keeper, the ball collar having a plurality of internal raised circumferential rings with a circumferential recess between each raised ring. The ball collar can slide between an uncoupled position in which the balls are in the recesses and a coupled position in which the balls are on the raised rings and protrude partially through the circular openings in the ball keeper. The implement shaft of an agricultural implement may have a plurality of cavities into which the balls extend in the coupled position.

DESCRIPTION OF THE PREFERRED EMBODIMENT

Figure 1:
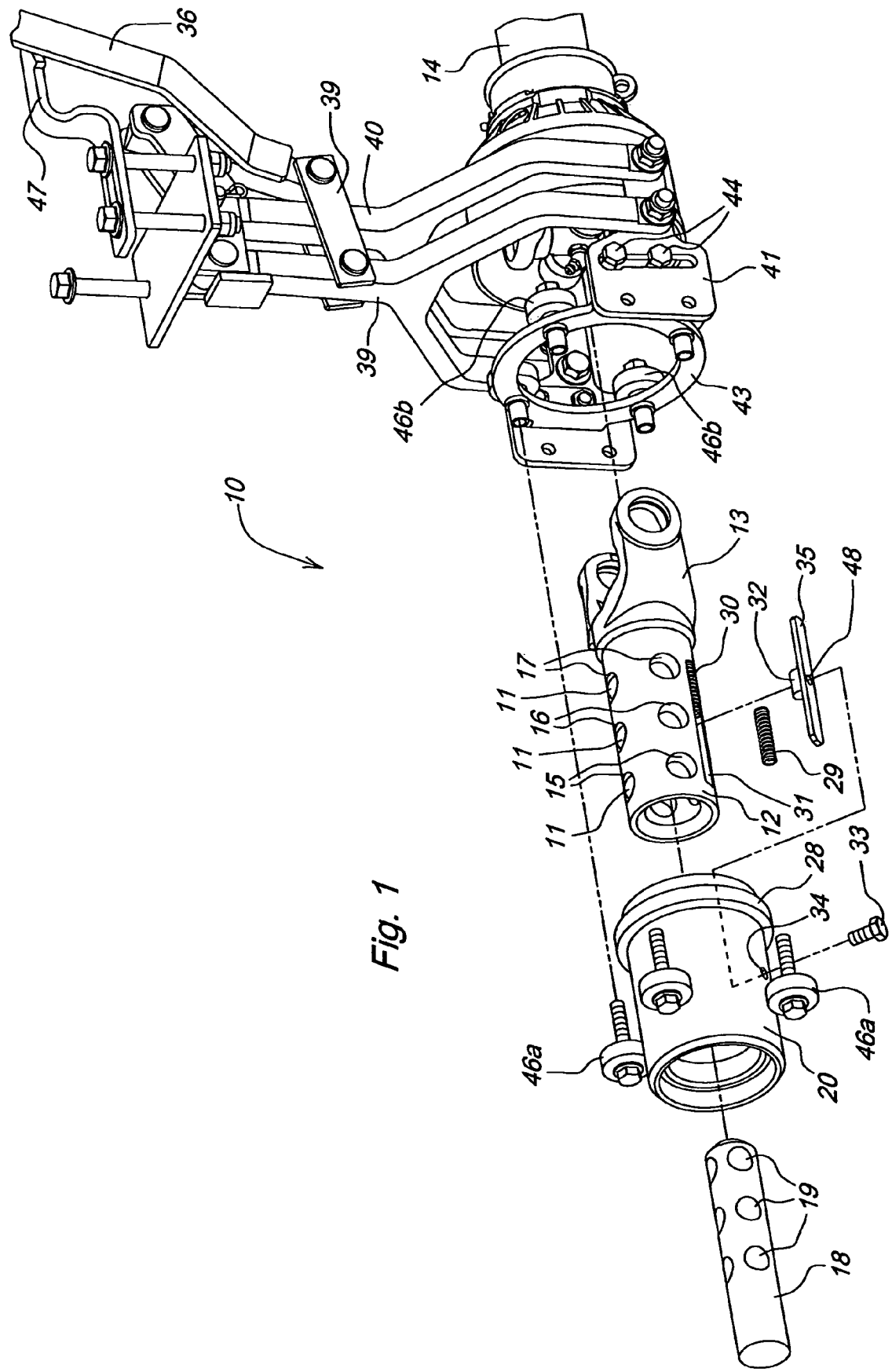
FIG. 1 is an exploded perspective view of an automatic locking ball coupler according to one embodiment of the invention.

The automatic locking ball coupler of the present invention may be used to couple a tractor PTO to a driveline or shaft of a rear mounted implement. As shown in FIGS. 1-5, automatic locking ball coupler 10 may include a plurality of locking balls 11 positioned in openings 15, 16, 17 in ball keeper 12. The ball keeper may be a hollow cylindrical tube with a longitudinal axis and may be joined to yoke 13 connected to driveline 14 attached to the rear PTO of a tractor. The yoke may be connected to a universal joint at the end of the driveline.

In one embodiment, locking balls 11 may be slidably received in circular openings 15, 16, 17 in ball keeper 12. The locking balls may be hardened steel and may have a diameter of between about ½ inch and about 1½ inches. Each opening in the ball keeper may be a counter bored hole dimensioned to allow the locking ball to float or move in a radial direction. The bottom of each opening may have a slightly smaller diameter than the top of the opening to allow just less than half of each ball to protrude to the inside of the ball keeper, but prevent the ball from sliding through the opening into the interior of the ball keeper. Alternatively, each opening may be cylindrical with a retainer ring attached to the opening to prevent the ball from sliding through the opening completely. The openings in the ball keeper may be arranged in a plurality of rows. For example, the rows may include a first or outer row 15, a second or intermediate row 16, and a third or inner row 17.

In one embodiment, the automatic locking ball coupler may be coupled to an implement shaft 18 that has a plurality of hemispherical shaped pockets 19 dimensioned to receive the locking balls. The implement shaft may be inserted into ball keeper 12. The inside diameter of ball keeper 12 may be about 3 mm larger than the ouside diameter of implement shaft 18, which will allow for some misalignment when the implement shaft is inserted into the ball keeper during the coupling process.

In one embodiment, ball keeper 12 and locking balls 11 may be positioned inside of ball collar 20. The ball collar may be a cylindrical tube with at least two internal rings. In the embodiment shown in FIGS. 4 and 5, ball collar 20 has three raised internal rings 21, 22, 23 between four recessed internal rings 24, 25, 26, 27. Each ring may be around the internal circumference of the ball collar. The outside of the ball collar may have a single raised ring 28 positioned around the outer circumference at or near the first end of the ball collar.

Figure 4:
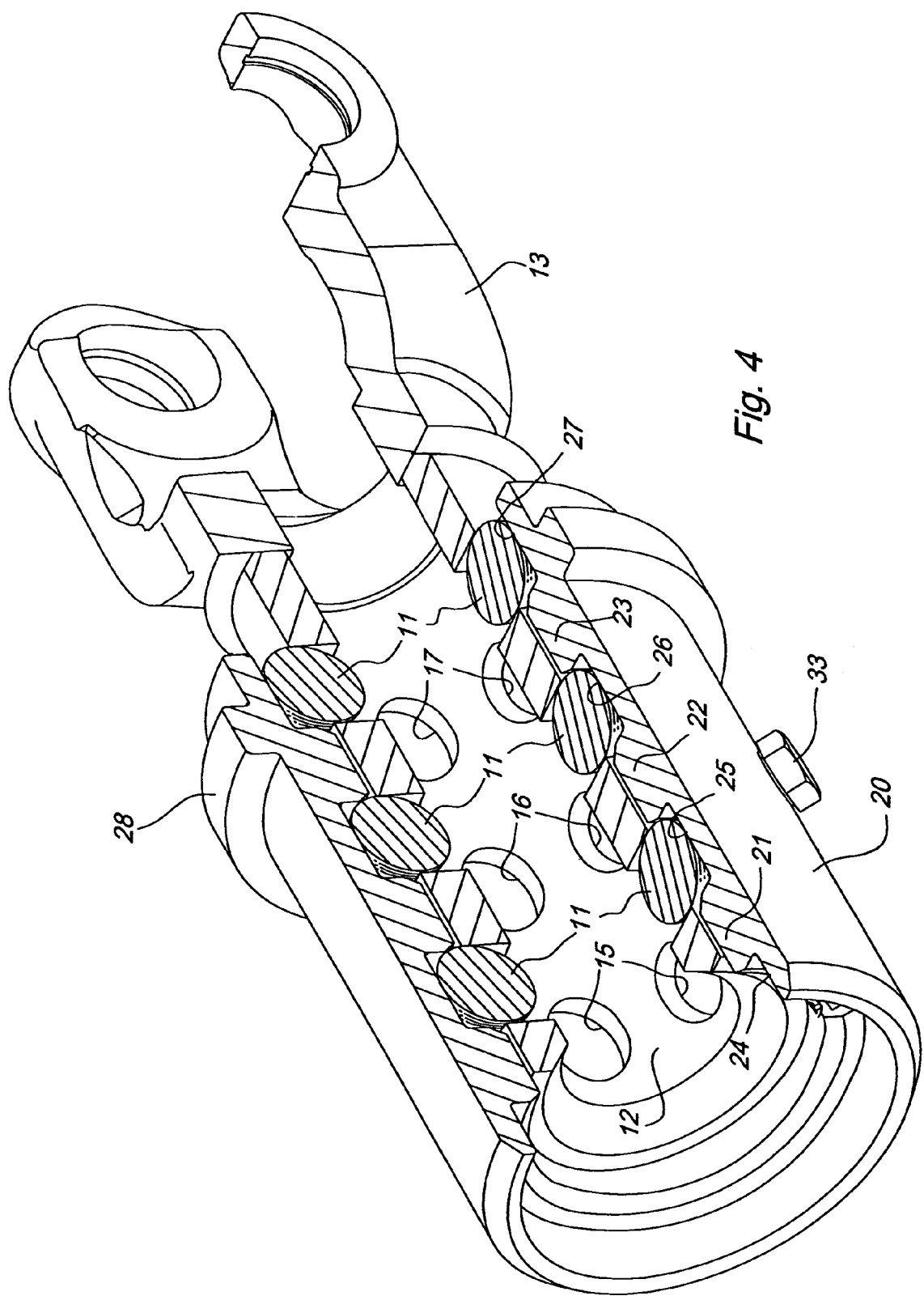
FIG. 4 is a section view of the ball keeper and ball collar of the automatic locking ball coupler in the uncoupled position, according to the embodiment of FIGS. 1-3.

In one embodiment, when ball keeper 12 and locking balls 11 are assembled in ball collar 20, the locking balls may move radially between a coupled position and an uncoupled position. In the coupled position, the locking balls may be aligned with raised rings 21, 22, 23 in the ball collar, as shown in FIG. 4. The raised rings in the ball collar may be sized to urge the locking balls inwardly through openings 15, 16, 17 and into pockets 19 in implement shaft 18. Each pocket in the implement shaft may be dimensioned to receive a locking ball and may have at least a partially hemispherical shape.

Figure 5:
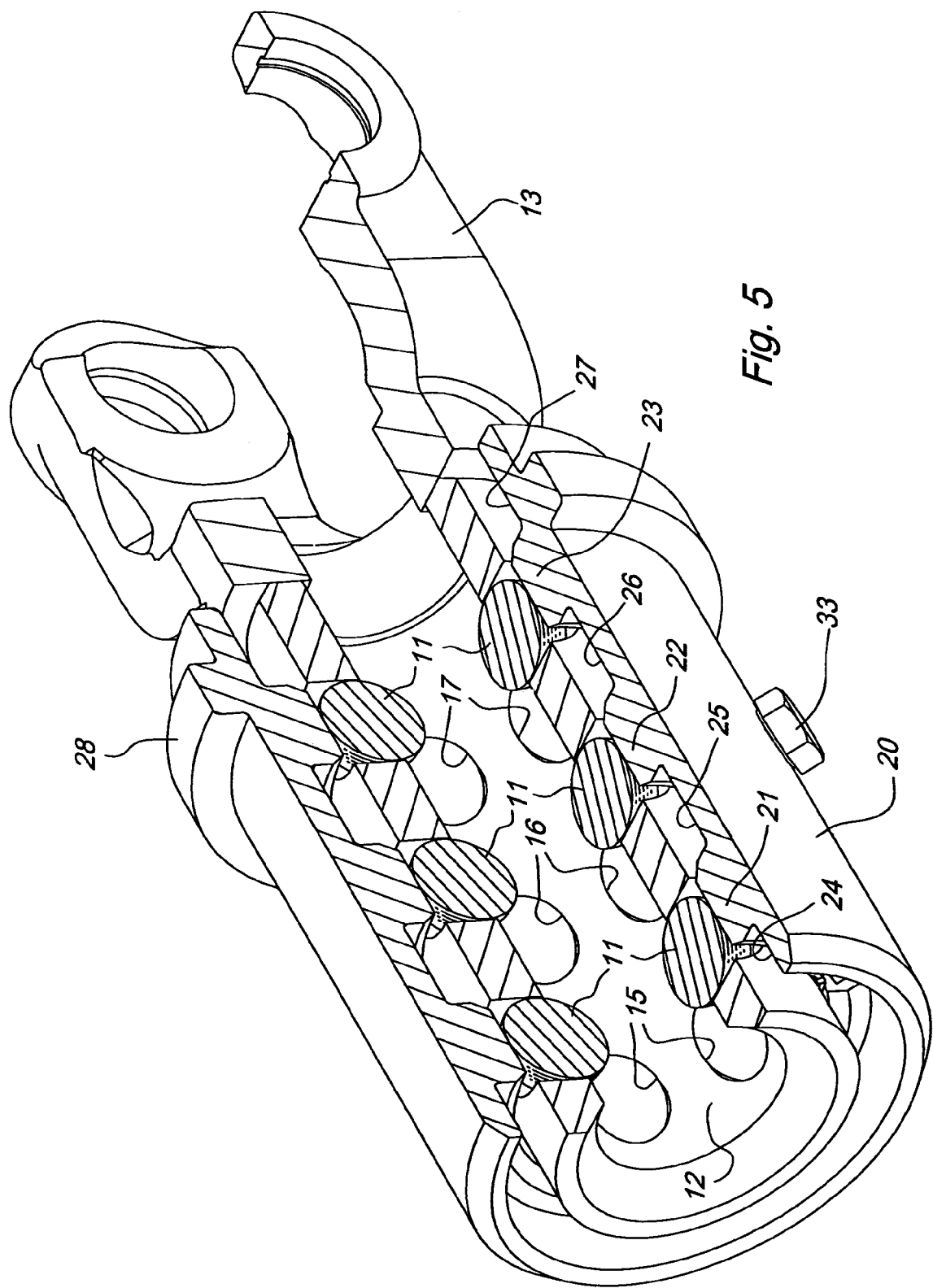
FIG. 5 is a section view of the ball keeper and ball collar of the automatic locking ball coupler in the coupled position, according to the embodiment of FIGS. 1-3.

In one embodiment, in the uncoupled position, the locking balls may be aligned with recessed rings 24-27 in the ball collar, as shown in FIG. 5. To move the locking balls to the uncoupled position, the ball collar may be moved axially away from the coupled position in either direction by the distance of one ball diameter. In the uncoupled position, the locking balls may be allowed to float outwardly into the recessed rings. The recessed rings may be sized to position the locking balls completely outside the inner diameter of the ball keeper. In the uncoupled position, the implement shaft may be freely inserted into or removed from the ball keeper.

In one embodiment, ball collar 20 may be urged to a neutral, coupled position relative to ball keeper 12 by springs 29, 30. The pair of springs may be located in recess 31 in the outer wall of ball keeper 12. Screw 33 may be inserted through hole 34 in ball collar 20 and into hole 48 in retainer 35. Retainer 35 may be integral with spacer 32 which is positioned between the pair of springs, or a separate spacer may be placed between the pair of springs. Hole 48 for centering screw 33 may be located in the center of the retainer and may be threadeded to retain screw 33 in place. Any displacement of the ball collar relative to the ball keeper will compress one of the springs and tend to urge the ball collar back toward the coupled position. Retainer 35 may have a length dimension the same as recess 31 in the ball keeper, and may be positioned over the pair of springs to hold both springs in the recess. Retainer 35 may be trapped between ball keeper 12 and ball collar 20, and may be held by centering screw 33.

In one embodiment, the automatic locking ball coupler may transmit torque and thrust loads between a tractor rear PTO and implement drive line. The loads may be applied from the tractor rear PTO to the implement driveline through ball keeper 12. The ball keeper may impart the force on the multiple balls 11, creating two reaction forces. The balls may exert a force in the circumferential direction on pockets 19 of implement shaft 18, tending to push the balls outward through ball keeper 12 until the balls touch the inside diameter of ball collar 20, creating the second force in the radial direction. If the balls touch the raised rings 21, 22, 23 of the ball collar, the force imparted by the ball keeper will turn the implement shaft if it is a torque load, or push the implement shaft along its axis if it is a thrust load.

In one embodiment, control lever 36 may be pivoted to connect or disconnect the automatic locking ball coupler and the implement shaft. A lower end of the control lever may be pivotably connected to mounted pivot 37. Control lever link 38 may connect control lever 36 to one of yoke-type links 39, 40. Both of the yoke-type links may pivot inside mounted pivot 37. The handle may be locked in an uncoupled position by latch 47.

In one embodiment, slotted links 41, 42 may be pivotably connected to each side of yoke-type links 39, 40, to create a four-bar linkage. Bearing collar 43 may be connected between slotted links 41, 42 using shoulder bolts 44 extending through the vertical slots in each slotted link. The shoulder bolts in the vertical slots may allow bearing collar 43 to slide up or down vertically without any horizontal (i.e., fore and aft) movement of the bearing collar with respect to the yoke-type links. There may be a side-to-side gap between bearing collar 43 and slotted links 41, 42 to allow for some misalignment while the automatic locking ball coupler is connected to the implement shaft.

In one embodiment, ball collar 20 may be connected to bearing collar 43 by bearings 46a, 46b on the sides of the bearing collar. Bearings 46a, 46b may be equally spaced around the bearing collar and ball collar, and the bearings may sandwich outer ring 28 of the ball collar.

Figure 2:
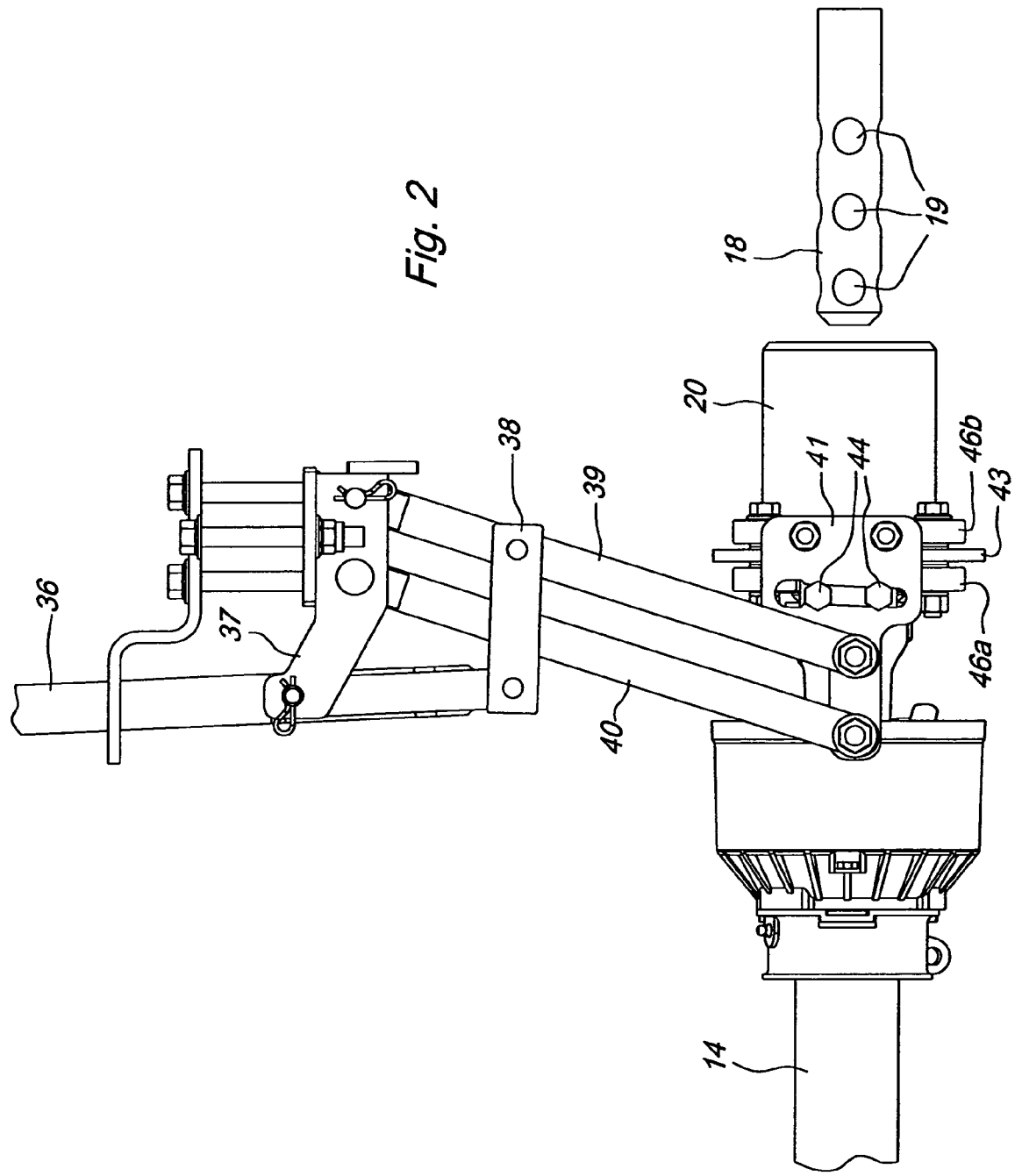
FIG. 2 is a side view of one embodiment of the automatic locking ball coupler in the uncoupled position.

In one embodiment, the method for coupling the automatic locking ball coupler to an implement shaft may be as follows. As shown in FIG. 2, control lever 36 may be used to push the automatic locking ball coupler toward implement shaft 18, causing the coupler to swing through an arc starting at between ten degrees and about forty-five degrees back from vertical, and preferably about thirty degrees back from vertical. The ball keeper may begin to engage implement shaft 19 when yoke-type links 39, 40 swing about one degree to about 15 degrees from its starting position, and most preferably begins to engage about 28 degrees behind vertical. Continued swinging toward the fully coupled position may move ball collar 20 downward while also moving it toward the stationary implement shaft.

Figure 3:
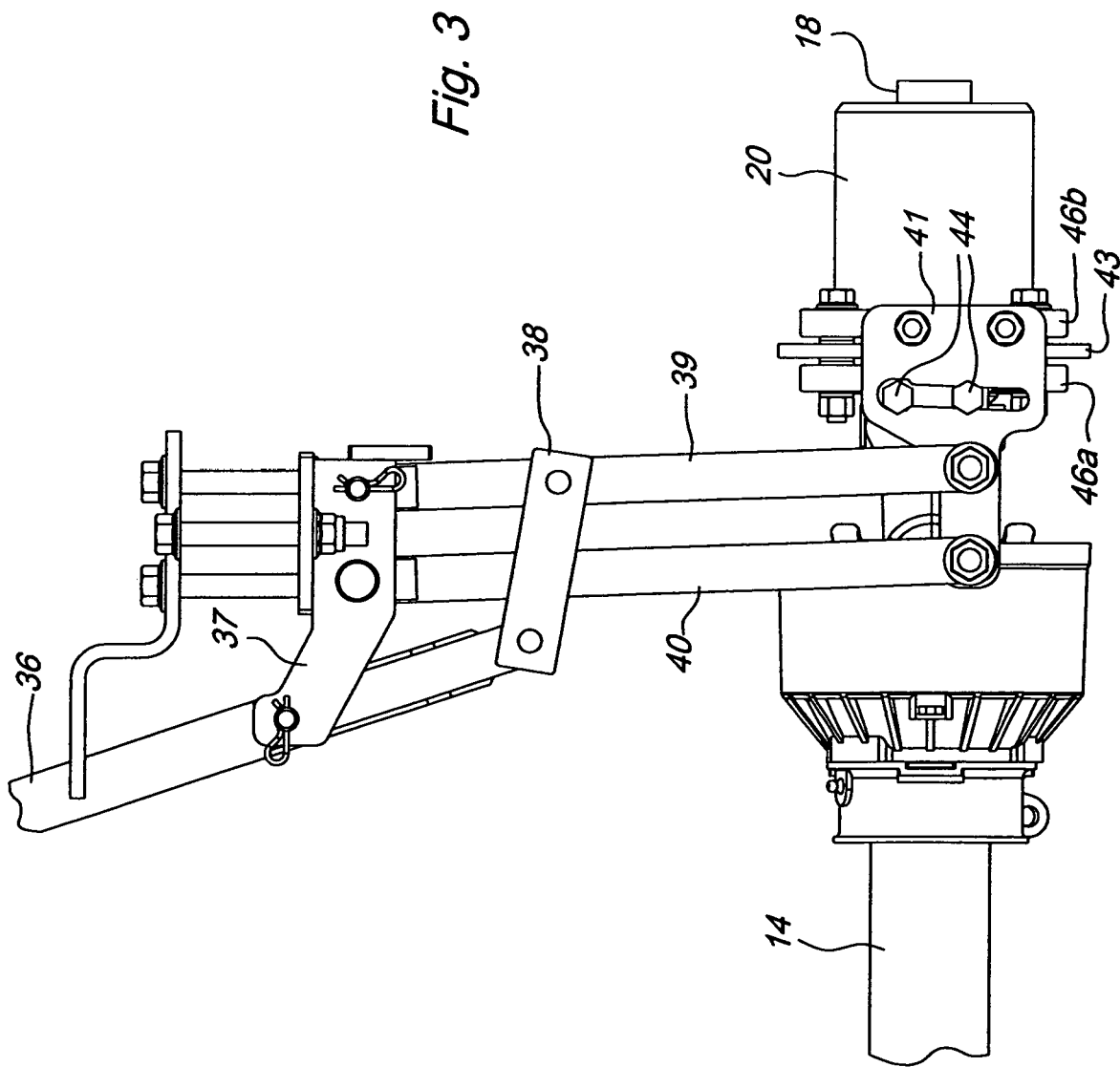
FIG. 3 is a side view of one embodiment of the automatic locking ball coupler in the coupled position.

As shown in FIG. 3, the automatic locking ball becomes fully coupled to the implement shaft when the yoke-type links hang at a nearly vertical position. As ball keeper 12 moves onto implement shaft 18, bearing collar 43 may move vertically up as shoulder bolts 44 slide upwardly in the vertical slots of slotted links 41, 42. When the implement shaft becomes fully coupled, shoulder bolts 44 may be at or near the top of the vertical slots.

In one embodiment, locking balls 11 may contact implement shaft 19 shortly after ball keeper 12 reaches the implement shaft. After locking balls 11 initially contact implement shaft 18, control lever 36 may continue to move ball keeper 12 onto the implement shaft. The movement of ball collar 20 forward or aft will cause one of centering springs 29, 30 to compress. Ball collar 20 will move relative to ball keeper 12 until locking balls 11 are able to move out into the recessed rings 24-27 of the ball collar. As locking balls 11 move into the recessed rings 24-27 of the ball collar, ball keeper 12 may continue moving further onto implement shaft 18 until the shaft hits a stop at the end of ball keeper 12. Locking balls 11 may be pressed into pockets 19 of implement shaft 18 by raised rings 21-23, while centering springs 29, 30 urge ball collar 20 back toward the neutral, coupled position.

In one embodiment, the method for uncoupling the automatic locking ball coupler 10 from an implement shaft may be similar to the method used for coupling. With the automatic locking ball coupler being coupled to an implement shaft, locking balls 11 are positioned in pockets 19 in implement shaft 18. To uncouple the automatic locking ball coupler, the operator may push control lever handle 36 and pull ball collar 20 away from the implement shaft. One of centering springs 29, 30 will compress, allowing ball collar 20 to move relative to ball keeper 12 and allow the locking balls to move into recessed rings 24-27. After locking balls 11 clear implement shaft 18, the centering spring will push ball collar 20 back to the neutral, coupled position where it will stay until the automatic locking ball coupler is re-coupled to another implement shaft.

Having described the preferred embodiment, it will become apparent that various modifications can be made without departing from the scope of the invention as defined in the accompanying claims.

Assignment

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

The invention claimed is:

1. An automatic locking ball coupler of a power take off comprising:
    a ball keeper connected to the power take off and having a longitudinal axis and a plurality of circular openings in a cylindrical surface thereof;
    a plurality of locking balls received in the circular openings and movable radially to protrude inwardly through the circular openings;
    a ball collar having a cylindrical internal bore with the cylindrical ball keeper inside the bore, the ball collar having a plurality of internal circumferential rings and recesses between the rings; the ball collar biased to a coupled position in which the rings urge the locking balls to protrude inwardly through the circular openings to engage hemispherical pockets in an implement shaft, and wherein the ball collar can move against the bias in a first direction or in a second direction along the longitudinal axis to an uncoupled position in which the implement shaft urges the locking balls out into the recesses as the ball keeper moves axially over the implement shaft, preventing the locking balls from protruding inwardly through the circular openings;
    a control lever having a lower end connected to a pivoting linkage to swing the pivoting linkage fore and aft; and
    the pivoting linkage extending between a mounted pivot and a bearing collar connected to the ball collar, the pivoting linkage moving the bearing collar fore and aft to move the ball collar between the coupled position and the uncoupled position, the bearing collar being slidably mounted to the pivoting linkage so that it can move vertically with respect to the pivoting linkage.

2. The automatic locking ball coupler of claim 1 wherein the pivoting linkage comprises a pair of yokes connected between the mounted pivot and the bearing collar.

3. The automatic locking ball coupler of claim 1 further comprising a plurality of springs urging the ball collar toward the coupled position.

4. The automatic locking ball coupler of claim 1 further comprising a plurality of bearings around the ball collar connecting the ball collar to the bearing collar.

5. The automatic locking ball coupler of claim 1 further comprising a universal joint between the ball deeper and the take off the ball keeper.

6. A coupler comprising:
    a hollow cylindrical ball keeper having a first end connected to a driveline attached to a tractor power take off, the ball keeper having a plurality of rows of circular openings;
    locking balls slidably received in the circular openings;
    a hollow cylindrical ball collar having a cylindrical internal bore with the ball keeper inside the bore, the ball collar having a plurality of internal raised circumferential rings with a circumferential recess between the raised rings; the ball collar slidable in a first direction or in an opposite second direction to an uncoupled position in which the balls are in the recesses, the ball collar biased to a coupled position in which the balls are on the raised rings and protrude partially through the circular openings in the ball keeper; and
    an implement shaft having a plurality of hemispherical pockets into which the balls extend in the coupled position, the implement shaft urging the locking balls into the recesses as the ball keeper moves axially over the implement shaft into the uncoupled position, preventing the locking balls from protruding inwardly through the circular openings;
    a control lever having a lower end connected to a pivoting linkage to move the pivoting linkage fore and aft; and
    the pivoting linkage extending between a mounted pivot and a bearing collar connected to the ball collar, the pivoting linkage moving the bearing collar fore and aft to move the ball collar between the coupled position and the uncoupled position, the bearing collar being slidably mounted to the pivoting linkage so that it is movable vertically with respect to the pivoting linkage.

7. The coupler of claim 6 wherein the balls extend only partially through the openings toward the inside of the ball keeper in the coupled position.

8. The coupler of claim 6 further comprising a first spring and a second spring mounted between the ball keeper and ball collar, the first and the second springs urging the ball collar toward the coupled position.

9. The coupler of claim 6 further comprising a plurality of bearings between the ball collar and the bearing collar.

10. The coupler of claim 6 wherein the pivoting linkage comprises a pair of yokes pivotably attached between the coupler and a mounted pivot to swing the coupler between the coupled and uncoupled positions.

11. An apparatus for coupling a tractor power take off to an implement shaft comprising:
    a plurality of locking balls received within a plurality of rows of openings in a hollow cylindrical ball keeper,
    an implement shaft having a plurality of hemispherical pockets, the implement shaft urging the balls radially outwardly as the ball keeper slides over the implement shaft; and
    a ball collar having a cylindrical internal bore with the ball keeper inside the bore, and having a plurality of raised rings aligned with the locking balls in a coupled position in which the locking balls extend radially inwardly partially through the openings into the hollow cylindrical ball keeper, and a plurality of recessed rings aligned with the locking balls in an uncoupled position in which the locking balls do not extend radially inwardly through the openings; the ball collar slidable in either of two opposite directions from the coupled position to the uncoupled position;

a control lever having a lower end connected to a pivoting linkage to swing the pivoting linkage fore and aft; and the pivoting linkage extending between a mounted pivot and a bearing collar connected to the ball collar, the pivoting linkage moving the bearing collar fore and aft to move the ball collar between the coupled position and the uncoupled position the bearing collar being slidably mounted to the pivoting linkage so that it can move vertically with respect to the pivoting linkage.

12. The apparatus of claim 11 further comprising at least one spring urging the ball collar toward the coupled position.

* * * * *